United States Patent
Scheidig

(10) Patent No.: US 7,039,867 B1
(45) Date of Patent: May 2, 2006

(54) METHOD AND SYSTEM FOR CONTROLLING AN OPERATOR INTERFACE WITH DISPLAY FIELDS CONTAINING GRAPHICS AND TEXT

(75) Inventor: Karola Scheidig, Pliening (DE)

(73) Assignee: Oce Printing Systems GmbH, Poing (DE)

( * ) Notice: Subject to any disclaimer, the term of this patent is extended or adjusted under 35 U.S.C. 154(b) by 0 days.

(21) Appl. No.: 09/582,543

(22) PCT Filed: Dec. 29, 1998

(86) PCT No.: PCT/EP98/08495

§ 371 (c)(1),
(2), (4) Date: Sep. 25, 2000

(87) PCT Pub. No.: WO99/34279

PCT Pub. Date: Jul. 8, 1999

(30) Foreign Application Priority Data

Dec. 29, 1997 (DE) .............................. 197 58 029

(51) Int. Cl.
G06F 3/00 (2006.01)
(52) U.S. Cl. ............... 715/703; 715/810; 715/835; 704/8; 358/1.13
(58) Field of Classification Search ........... 345/703, 345/764, 765, 810, 835, 168, 171; 715/536, 715/703, 764, 765, 810, 835; 704/1, 2, 8
See application file for complete search history.

(56) References Cited

U.S. PATENT DOCUMENTS

| | | | |
|---|---|---|---|
| 4,907,282 A | * | 3/1990 | Daly et al. ................... 383/242 |
| 5,045,880 A | | 9/1991 | Evanitsky et al. ............ 399/82 |
| 5,917,484 A | * | 6/1999 | Mullaney .................... 345/703 |
| 5,978,754 A | * | 11/1999 | Kumano ........................ 704/3 |
| 6,073,090 A | * | 6/2000 | Fortune et al. ................ 704/8 |
| 6,384,922 B1 | * | 5/2002 | Hayama et al. ............ 358/1.13 |

FOREIGN PATENT DOCUMENTS

| | | |
|---|---|---|
| DE | 195 18 367 A1 | 11/1996 |
| WO | WO 90/12358 | 10/1990 |
| WO | WO 94/11804 | 5/1994 |
| WO | WO 94/27229 | 11/1994 |

OTHER PUBLICATIONS

IBM Technical Disclosure Bulletin, Language Selection Palette, vol. 37, No. 06B, Jun. 1994, pp. 461-463.
Japanese Abstract, Pub. No. 07164685 A, Date of Pub. Jun. 27, 1995.

* cited by examiner

*Primary Examiner*—Kieu D. Vu
(74) *Attorney, Agent, or Firm*—Schiff Hardin LLP

(57) ABSTRACT

A method and system for displaying an operator interface on a computer includes graphic elements with text portions. A language is selected by a user and the graphic elements are displayed with text portions in the selected language. The text portions in the selected language are provided by displaying pixels of the text from a text file with pixels of the corresponding graphic from a graphic image file.

12 Claims, 3 Drawing Sheets

METHOD AND SYSTEM FOR CONTROLLING AN OPERATOR INTERFACE WITH DISPLAY FIELDS CONTAINING GRAPHICS AND TEXT

BACKGROUND OF THE INVENTION

The present invention relates to a method for controlling an operator interface of a computer-controlled system, particularly of a high-performance printer, whereby a computer processes a control panel program, which defines an operator interface on a monitor, whereby a plurality of display fields are provided on the operator interface, which display fields respectively contain graphics elements and text. Further, the invention relates to a system for purposes of controlling such an operator interface.

DESCRIPTION OF THE RELATED ART

In order to facilitate the operation of a computer-controlled system, for example of a high-performance printer, display fields, apart from an explanatory symbol for a function, also contain an explanatory text. While the graphics in these display fields can be kept for countries of different language, it is expedient, for a better understanding, to provide the text in the respective language. In the prior art, a bitmap is prepared for each display field, which bitmap defines pixels corresponding to the display image to be displayed together with the text and is stored upon request. When the computer-controlled system is sold in many countries of world, an extremely great number of bitmaps must be available, which contain the multilingual texts. Therefore, large memory requirements are necessary for such a solution. Another disadvantage is that it takes relatively long for an image to be build up within a display field given the currently normal relatively high pixel density, although the processors are fast, so that the user experiences less comfort with respect to the menu prompting.

An image output device is known from "Patent Abstracts of Japan" with the publication number JP 07164685 A, whereby bits of information are displayed on a LCD-display. Menu texts that are present in a plurality of language versions are selected by means of a switching unit and are displayed on the display. The size of the display is adjusted dependent on the selected language.

"IMB Technical Disclosure Bulletin", vol. 37, No. 065, June 1994, page 461 through 463 discloses a method for controlling an operator interface, whereby an operator can select a language among texts in a plurality of languages after a system has been started. The selected language is displayed in a window, which displays further bits of information about an application program.

Published International Patent Application WO 94/11804 A1 describes an "user interface", which displays status information of a printer. Texts to be displayed are provided in files. A computer-supported sequencer accesses these text files in order to display these.

German Patent Document DE 195 18 367 A1 describes a method for storing and playing back a supply of fixed screen texts. The operator can be guided by means of the screen texts in a plurality of languages. Text parts that are language-independent are combined with language-dependent variable texts in order to be able to display a complete text on the screen.

Further, Published International Application WO 94/27229 A1 describes an operator interface, whereby text elements or graphic elements are simultaneously displayed on a screen. Text parts and graphics parts can be stored in different areas and are combined given the representation on the screen.

SUMMARY OF THE INVENTION

The present invention is based on the object of providing a method and a system for controlling an operator interface, whereby the graphics elements and texts in different languages to be displayed in the display fields are built up fast and whereby the memory requirements are low.

The present invention proposes a method for purposes of controlling an operator interface of a computer-controlled system, whereby a computer processes a control panel program, which defines an operator interface on a screen, whereby a plurality of display fields are provided on the operator interface, which respectively contain graphics elements and text, whereby a graphics bitmap is stored for each display field, which graphics bitmap contains pixels corresponding to the graphics element to be displayed; a plurality of language versions are stored in text files for the text of each display field; one single language is selected for the texts of all display fields depending on an input instruction; the graphics bitmap that belongs to every display field is loaded into the main memory of the computer; text files of the selected language are accessed; and text pixels and pixels of the graphics bitmap are represented together given the display of the display field.

According to the invention, the pixels that are to be displayed in total in the display field are divided. On one hand, the pixels are defined by means of a graphics bitmap that does not contain text pixels but only graphics elements. Other pixels that belong to the texts are generated by means of the graphics controller to which the respective text is supplied. This text is stored in a plurality of languages in a plurality of text files. When a specific language is now selected, the pixels of the graphics bitmap are displayed in the display field and the text pixels are added according to the selected text file. Therefore, merely one graphics bitmap, whose pixels are combined with the pixels of the selected language of the text, must be provided for each display field. When the control panel program is activated and a language change is made, merely a new text file with the corresponding language must be accessed—the graphics bitmap can be kept. Thus, the image buildup for a display field is also accelerated, since merely the pixels of the text must be combined with the already present pixels of the graphics bitmap.

In a preferred exemplary embodiment of the invention, the graphics bitmaps are stored in a ROM-component. Given a call of a menu of the operator interface, all graphics bitmaps of this menu are loaded into the main memory and remain there as long as the display fields are needed for the menu and for further menus. When the language is changed, loading processes are thus foregone for the graphics bitmaps and the image buildup can be speeded up.

According to a further aspect of the invention, a system for purposes of controlling an operator interface of a computer-controlled system is proposed, whose feature include a control panel program, which defines an operator interface on a screen, whereby a plurality of display fields are provided on the operator interface, which display fields respectively contain graphics elements and text, a graphics bitmap stored for each display field, which graphics bitmap contains pixels corresponding to the graphics element to be shown, a plurality of language versions stored in text files for the text of each display field, one single language selected for the texts of all display fields depending on the input instruction, the graphics bitmap that belongs to every display field loaded into the main memory of the computer, and whereby text files of the selected language are accessed and text pixels and pixels of the graphics bitmap are represented together given the display of the display field. The advantages that have already been described in connection with the inventive method derive as a result of this system.

BRIEF DESCRIPTION OF THE DRAWINGS

The invention is subsequently further explained upon reference to the drawing.

DETAILED DESCRIPTION OF THE PREFERRED EMBODIMENTS

Figure 1:
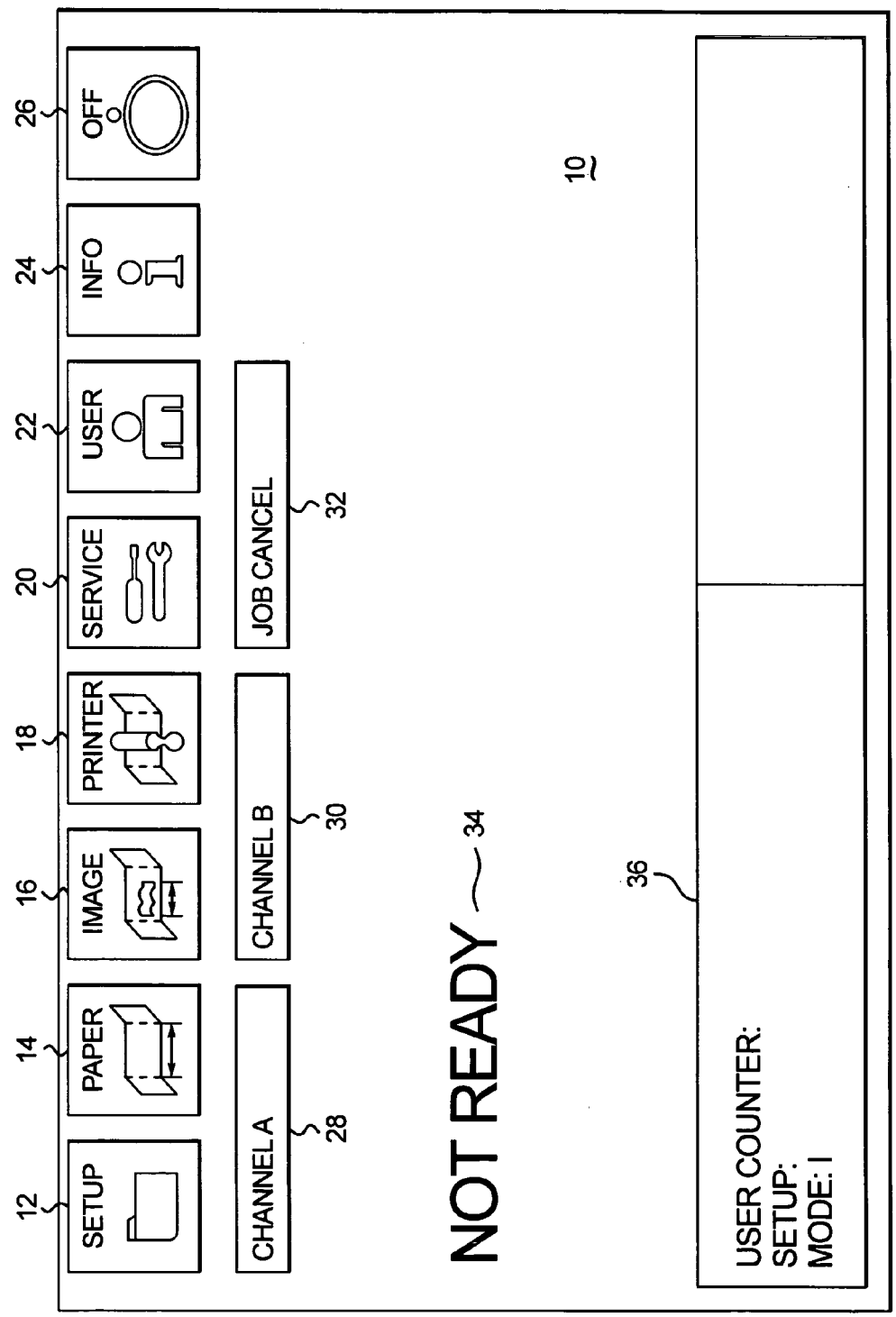
FIG. 1 is a screen view of a traditional operator interface with texts in the English language.

FIG. 1 schematically shows a screen 10, on which a control panel program generates an operator interface. The screen 10 is fashioned as TFT (thin film transistor) display, i.e. that it is a LCT) screen, whereby the individual pixels are driven by means of vapor-deposited transparent horizontal and vertical interconnects. The thin film transistors (TFT) that are additionally arranged for each pixel at the cross points purposefully switch-on and switch-off the electrical fields for the polarisation of the anisotropic liquid. Optical highly qualitative images can be generated in this way.

Display fields 12 through 26 are present in a first row of the screen 10, which display fields that contain a graphics element and text. The screen 10 is further fashioned as a sensor screen, i.e. that touch-sensors are disposed under the display fields 12 through 26, which touch-sensors recognize the touching by means of a pen or a finger. Given operating of one of the display fields 12 through 26, the control panel program branches into a corresponding menu, in which the operator can input different parameters, in which bits of information are displayed (in display field 24) or via which the computer-controlled system—a high-performance printer in the present case—can be switched in the off-state (in display field 26). The display fields 12 through 26 contain symbols as graphics elements, which symbols indicate the function of the menu called by the control panel program.

Rectangular displays 28, 30 and 32, which exclusively contain texts, are provided below the display fields 12 through 26. Further, a text field 34 is displayed, which indicates the status of the high-performance printer. A parameter field 36, which shows operating parameters, is provided in the lower image part of the screen 10. As can be seen from FIG. 1, all texts that are shown at the screen are in English. However, it is desirable that the texts to be displayed are in the language of the location depending on the location where the high-performance printer is installed.

Figure 2:
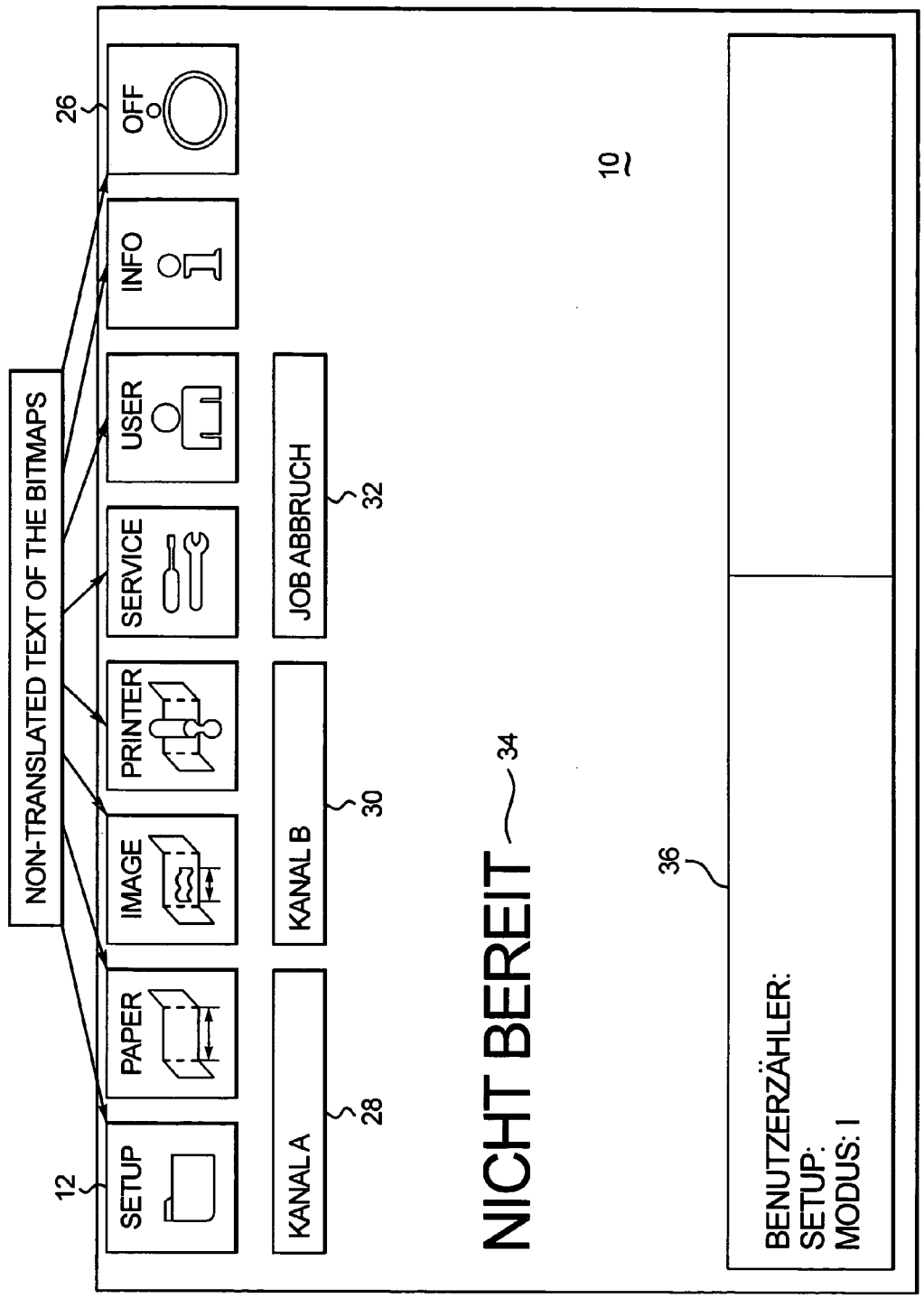
FIG. 2 is a screen view of a similar operator interface, whereby the display fields still contain texts in the English language, but the further texts are in the German language.

FIG. 2 shows a version of the operator interface, whereby the texts are displayed in German in the sections 28 through 36. Such a representation is relatively simple to manage, since the display of texts can be managed relatively fast with the aid of the graphics controller, whereby corresponding text files are accessed. However, it can be recognized that the text elements in the display fields 12 through 26 are still in the English language, since it is relatively difficult to only modify the text portion in images with graphics elements. Given a display according to FIG. 2, the operator may not be comfortable with the display, since he must read the menu in two languages.

Figure 3:
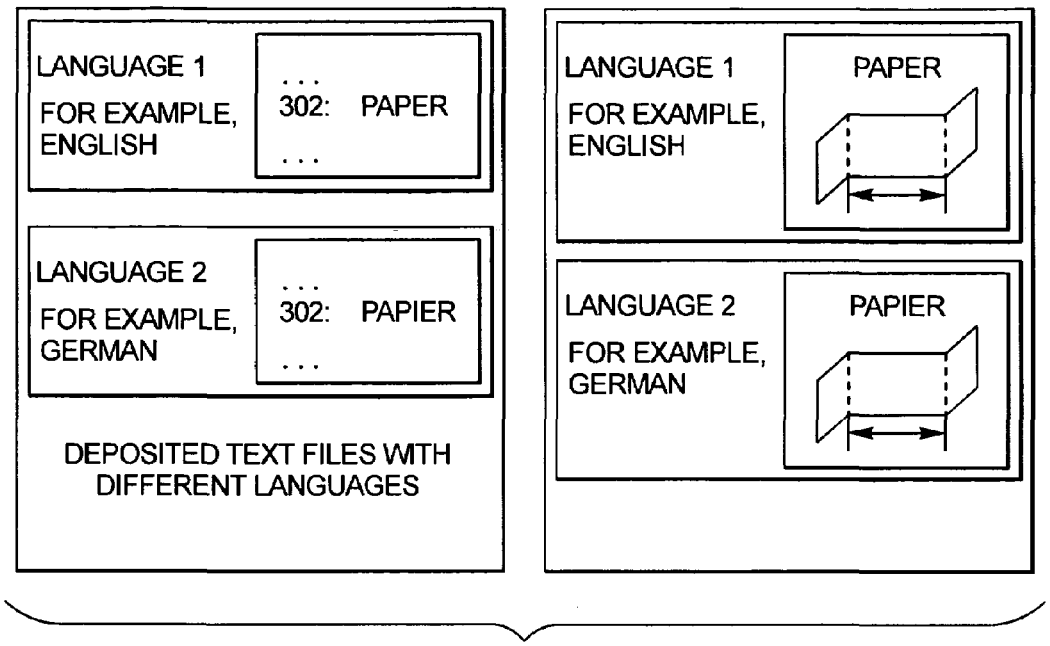
FIG. 3 is a diagram schematically showing the editing of text files and graphics data.

In the left image part, FIG. 3 shows the editing of text files with different languages. Each text file with identical bits of information, for example with the term "paper" receives the same access number, 302 for example. When the operator selects a language, for example English or German, the text file of the same number—the number 302 in the present case—is accessed and this text is represented in the display field together with the graphics. It can be recognized in the right image part that the text "paper" is faded-in from the corresponding text file with the number 302 with respect to the graphics part, which shows a paper web given the selected language English. The display field with the language German can be seen therebelow. The text file with the number 302 is also accessed. As a result of the fixed language German, the term "Papier" is now displayed on the display field. It is to be noted that the graphics part need not be reloaded but remains unchanged. Merely the respective text in the chosen language is faded-in.

Figure 4:
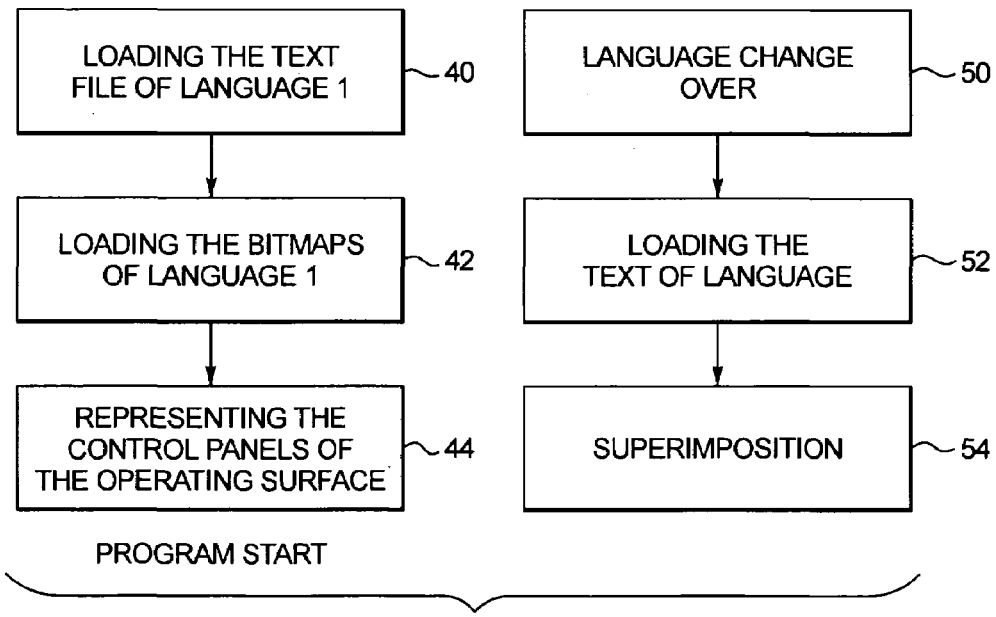
FIG. 4 is a pair of flowcharts for the program start of the control panel program and for the language changeover.

FIG. 4 shows flowcharts given the program start and given a change of the language. According to strep 40, the texts are initially loaded into the main memory corresponding to the selected language 1. Subsequently, the graphics bitmaps for the different display fields are loaded (step 42) and all display fields are displayed on the screen (step 44), i.e. that texts and graphics bitmaps are superimposed and are represented together.

The right image part shows process steps 50 through 54, as they are applied when the language is changed. For example, it is changed from the language 1 to the language 2 in the step 50. This changing ensues by means of inputs of the user after the application menu has been called, i.e. that an application menu is called after the display field 22 has been touched and the application menu is branched into a language changeover menu from there. According to step 52, the texts of the newly selected language stored in the text files are loaded into the main memory. After these texts have been transformed into pixels by means of the graphics controller, they are displayed together with the graphics bitmaps, which were still kept in the main memory, whereby the windowing technique is applied for the representation in general.

Although other modifications and changes may be suggested by those skilled in the art, it is the intention of the inventors to embody within the patent warranted hereon all changes and modifications as reasonably and properly come within the scope of their contribution to the art.

I claim:

1. A method for controlling an operator interface of a computer-controlled printing system, comprising the steps of:

processing a control panel program by a computer, said control panel program defining the operator interface for a printer on a screen;

providing a plurality of display fields displayed simultaneously on the operator interface, said plurality of display fields including display fields containing both graphics elements and text displayed together in each of said display fields, each of said graphics elements corresponding to a printer function, said text that is displayed with corresponding ones of said graphics elements corresponding to the same printer functions as said graphic elements;

storing graphics files which contain pixels corresponding to the graphics element to be represented for each of said display fields containing both graphics elements and text, said graphics files including only one instance of each different graphics element;

storing a plurality of language versions in text files for the text of each of said display fields containing both graphics elements and text, said text that is to be displayed with corresponding ones of said graphics elements including multiple instances of the text associated with each graphics element wherein each instance of the text is in a different language, said text files being stored separated from said graphics files;

selecting one single language from said plurality of language versions for the texts of all of said display fields containing both graphics elements and text depending on an input instruction;

loading the graphics files that belong to every one of said display fields containing both graphics elements and text that are displayed simultaneously into a main memory of the computer;

accessing text files of the language selected in said selecting step to retrieve text of the selected one of said plurality of language versions; and simultaneously displaying the display fields containing both graphics elements and text by representing text pixels of the text files of the selected language together with the pixels of the corresponding graphics files for each display field, both said graphics elements and said text of each display field relating to corresponding function.

2. A method according to claim 1, further comprising the steps of:
storing the graphics files in a ROM component, and
when a menu of the operator interface is called, loading all graphics files of the called menu into the main memory and retaining the graphics files in the main memory as long as the display fields are required for the menu and for further menus.

3. A method according to claim 1, further comprising the steps of:
utilizing a sensor screen as a screen, and
branching the control panel program into an input menu when one of the display fields is touched, the input menu accepting user inputs bits of information.

4. A method according to claim 3, further comprising the steps of:
proceeding from an initial menu,
calling an application-submenu by operating a display field,
selecting the language in the application-submenu.

5. A method according to claim 1, further comprising the steps of:
reading out the new text from an appertaining text file, and
displaying the text that was read out instead of a previous text without changing the graphics files of an appertaining display field given a change of the language.

6. A method as claimed in claim 1, wherein said printer is a high-performance printer.

7. A system for controlling an operator interface of a computer-controlled printing system having a screen and a main memory, comprising:

a control panel program which defines the operator interface for a printer on the screen;

a plurality of display fields simultaneously on the operator interface, said display fields containing both graphics elements and text displayed together in each said display field, said display fields corresponding to functions on said operator interface, each of said graphics elements corresponding to a printer function, said text that is displayed with corresponding ones of said graphics elements corresponding to the same printer functions as said graphics elements;

a graphics file for ones of said display fields, said graphics file containing pixels corresponding to the graphics element to be shown in each said display field, only one graphics file for each said display field, said graphics files being associated with the functions of the corresponding display fields;

a plurality of language versions stored in text files for the text of each said display field, a plurality of texts being provided for each of the functions of the corresponding display fields, said text files being stored separated from said graphics files;

an input that is operable for receiving an input instruction to select one language for the texts of all display fields from said plurality of language versions;

the graphics file that belongs to every said display field being loaded into the main memory, each of said graphics files relating to the function of said corresponding display field; and text files of the selected language being accessed and text pixels of the selected language and pixels of corresponding ones of the graphics files being represented together in said display fields given the display of the display fields, said text describing the function of the corresponding display field in the selected language.

8. A system according to claim 7, further comprising:
a ROM component in which the graphics files are stored and
the main memory loading and retaining the graphics files of the a menu as long as the display fields are required for the menu and for further menus given a call of a menu of the operator interface.

9. A system according to claim 7, further comprising:
a sensor screen as a screen, and
the control panel program branching into an input menu, said input menu accepting user inputs information when one of the display fields is touched.

10. A system according to claim 9, further comprising:
an output menu leading to an application-submenu called by operating a display field in which the language is selected.

11. A system according to claim 7, further comprising:
a graphics file displayed with new text read out from an appertaining text file and displayed instead of a previous text without changing the graphics file of an appertaining display field given a change of the language.

12. A system as claimed in claim 6, wherein said printer is a high-performance printer.

* * * * *